US010506511B2

United States Patent
Panje

(10) Patent No.: US 10,506,511 B2
(45) Date of Patent: Dec. 10, 2019

(54) POWER-SAVING PARAMETER COLLECTION FOR WI-FI NETWORKS

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/855,107

(22) Filed: Dec. 27, 2017

(65) Prior Publication Data

US 2019/0200289 A1 Jun. 27, 2019

(51) Int. Cl.
| | |
|---|---|
| *H04W 52/02* | (2009.01) |
| *H04W 24/10* | (2009.01) |
| *H04W 52/36* | (2009.01) |
| *H04W 76/14* | (2018.01) |
| *H04W 4/80* | (2018.01) |
| *H04W 84/12* | (2009.01) |

(52) U.S. Cl.
CPC ......... *H04W 52/0209* (2013.01); *H04W 4/80* (2018.02); *H04W 24/10* (2013.01); *H04W 52/367* (2013.01); *H04W 76/14* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 8,661,268 B2 | 2/2014 | Brooks et al. | |
| 9,173,165 B2* | 10/2015 | Stark ................. | H04W 52/0209 |
| 9,749,942 B2 | 8/2017 | Katar et al. | |
| 2007/0076620 A1 | 4/2007 | Zhong et al. | |
| 2007/0258384 A1 | 11/2007 | Sammour et al. | |
| 2015/0099469 A1* | 4/2015 | Goldstein ............... | H04W 4/21 455/41.2 |
| 2016/0037566 A1* | 2/2016 | Jakusovszky ......... | H04W 8/005 455/41.2 |
| 2016/0080958 A1* | 3/2016 | Rinne ................... | H04W 24/10 370/338 |
| 2016/0164725 A1* | 6/2016 | Wu ....................... | H04W 76/10 713/168 |
| 2017/0093197 A1* | 3/2017 | Gao ........................ | H02J 7/025 |
| 2017/0164186 A1* | 6/2017 | Yong ...................... | H04W 8/005 |
| 2018/0063851 A1* | 3/2018 | Abraham .............. | H04W 72/10 |
| 2018/0139569 A1* | 5/2018 | Padgett .................. | H04W 4/80 |
| 2018/0184380 A1* | 6/2018 | Xue .................. | H04W 52/0251 |

* cited by examiner

*Primary Examiner* — Chi H Pham
*Assistant Examiner* — Vladislav Y Agureyev
(74) *Attorney, Agent, or Firm* — Stewart M. Wiener

(57) ABSTRACT

Methods and systems for exchanging wireless network statistics between at least one client and an access point. The access point may be capable of operating in a wireless network, and be enabled to communicate with one or more client devices in the wireless network using together Bluetooth Low Energy (BLE) communications.

17 Claims, 4 Drawing Sheets

POWER-SAVING PARAMETER COLLECTION FOR WI-FI NETWORKS

CROSS REFERENCE TO RELATED APPLICATIONS

None

BACKGROUND

The subject matter of this application relates to wireless networks and more particularly to systems and methods for power-efficient collection of parameters for wireless network data.

A wireless local area network (WLAN) typically includes one or more access points (APs) that provide shared wireless communication channels for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time.

Due to the increasing ubiquity of wireless networks, when a STA seeks to join a wireless network, the STA may have a choice between multiple wireless networks and/or between multiple APs (e.g., that form an extended BSS). The 802.11k standard provides a protocol for a STA to discover the best available access point at any given point in time using a scanning operation to discover network parameters. In this manner, in a wireless LAN, each device normally connects to the access point (AP) that provides the strongest signal. In a network conforming to 802.11k, if the AP having the strongest signal is loaded to its full capacity, a wireless device (STA) can be made to connect to one of the available and underutilized APs. In this manner, though the signal may be weaker on an underutilized AP, the overall throughput can be greater because of more efficient use of the network bandwidth and related resources.

Because scanning operations may consume a significant amount of power, it is desirable to reduce power consumption associated with scanning and related data-gathering operations.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
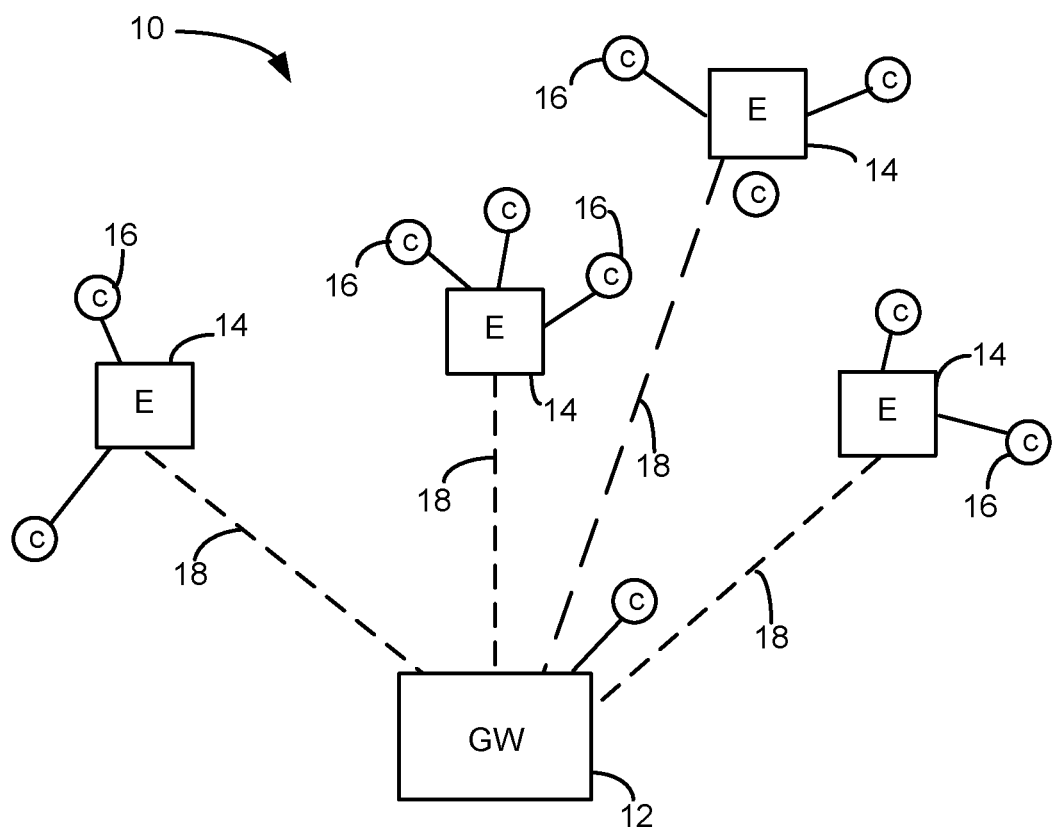
FIG. 1 shows an exemplary wireless network implementing the systems and methods disclosed in the present application.

Referring to FIG. 1, a network environment 10 may preferably include a gateway (GW) 12 and a plurality of access points (APs) 14, each of which may in turn be connected to one or more client devices (STAs) 16. The GW 12 may, for example, be a router or any other device capable of transmitting and receiving signals to/from the respective APs 14 and relaying such signals to another network, e.g. the Internet. The STAs 16 may each be a device such as a cell phone, laptop, or other electronic device that connects to a wireless network.

As noted earlier, IEEE 802.11k and 802.11r are industry standards that enable seamless Basic Service Set (BSS) transitions in a wireless network environment. The 802.11k protocol specifies a procedure to discover an optimal AP for any particular STA to connect to. Specifically, each STA typically attempts to connect to the AP that provides the strongest signal, but if the AP having the strongest signal lacks sufficient bandwidth, the STA connected to the next-strongest AP having sufficient bandwidth. Furthermore, as the bandwidth demands of the STAs on the network change over time, STAs may switch APs in order to boost network throughput.

For example, in order to preserve or maintain the quality-of-experience (QoE) and quality-of-service (QoS) for applications such as VoIP and video streaming respectively, STAs may use radio-frequency transmissions between the STA and the AP to which it is connected to exchange measurements pertaining to the wireless network, which are periodically collected by the AP. This information can be used by the STA to disconnect from one AP and connect to a new AP to better support a data transmission. Since the STA has the network information to select an optimal new AP prior to disconnecting from the existing AP, this protocol considerably accelerates the process of switching from one AP to another in the same network.

More broadly, shared measurements of network parameters can enable any device, AP or client, to better understand the environment in which it is operating. Accordingly, a variety of requests can be generated for which the device receiving a request can respond with a report. As one example, the "Neighbor Report" request is sent from a client to a serving AP. The serving AP returns a "Neighbor Report" report containing information about neighboring APs that are candidates for the client to re-associate with. This AP candidate list can be used by the client to associate with any suitable AP during roaming.

Most of the client devices STAs connected to APs in a wireless network are battery operated. Such devices include laptops, cell phones, PDAs, tablets and numerous other devices with limited available power. Unfortunately, the exchange of these measurements between an STA and an AP over the Wi-Fi network consumes some airtime and power, which adversely drains the batteries of many STAs as well as the APs which may be battery powered or backed.

Figure 2:
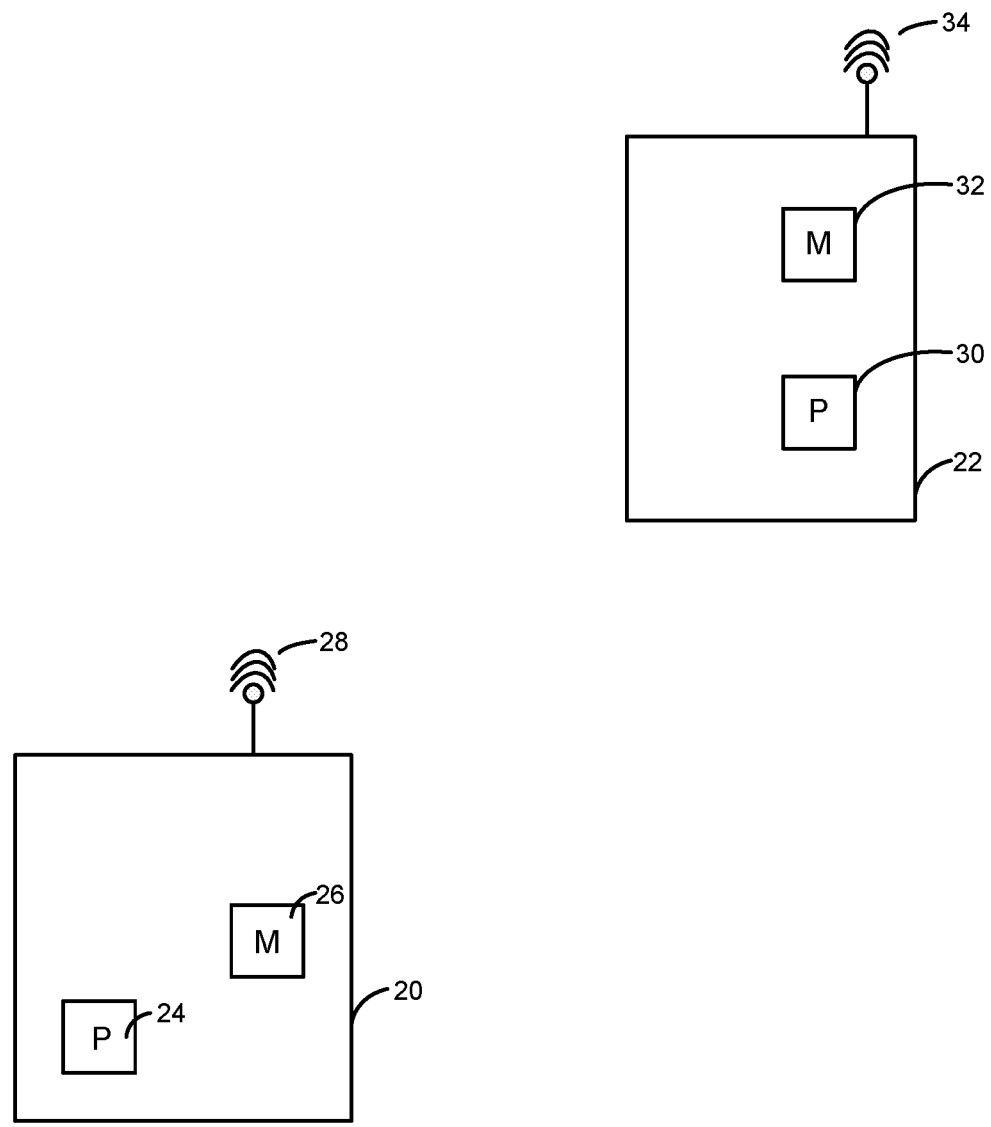
FIG. 2 shows an exemplary system by which wireless parameters are exchanged between a client device (STA) and an access point (AP) according to the present disclosure.

FIG. 2 shows an exemplary system that conserves power used to exchange Wi-Fi network parameters between STAs and APs. Specifically, an AP 20 may be equipped with a processor 24, memory 26, and an antenna 28 that together enable Bluetooth Low Energy (BLE) transmission capability. BLE typically uses less than one tenth of the power required by Wi-Fi to accomplish the same tasks.

Preferably, the processor 24 includes a BLE-compatible transceiver microchip connected to the antenna 28 to enable communication with other devices using the BLE protocol. Specifically, the processor 24 and memory 26 may preferably store and execute software implementing a radio interface operating in 2.4-2.4835 GHz ISM band, broadcasting over forty 2-MHz channels. Within each channel, data is transmitted using Gaussian frequency shift modulation, with a bit rate of 1 Mbit/s and the maximum transmit power of 10 mW. Those of ordinary skill in the art will appreciate that the AP 20 may be equipped with BLE-capability through other combinations of hardware, software, and/or firmware, including a dedicated antenna and/or Bluetooth chip connected to the processor 24, or any other appropriate means.

The AP 20 is preferably in communication with an STA 22, which may be a laptop, cell phone, PDA, tablet, or any other device that utilizes a wireless network via an access point. The STA also preferably includes a processor 30, memory 32, and antenna 34 that together enable communication with an AP 20 using the BLE protocol, as described above with respect to the AP 20. Those of ordinary skill in the art will appreciate that many STA devices are currently equipped with hardware and/or software to communicate using BLE.

Preferably, the memory 32 of the STA 22 stores an application that provides a new Vendor extension service over BLE, e.g. a "share Wi-Fi report". The corresponding client service is provided on the AP 20. In some embodiments, once the STA 22 connects to the AP 20, the application initiates the BLE service from the AP 20. In other embodiments, the STA 22 only initiates the BLE service when the battery level of the STA drops below a predetermined threshold. Once the BLE service is initiated, Wi-Fi network parameters are shared between the AP 20 and the STA 22 using BLE, thereby reducing both Wi-Fi airtime and power consumption by the STA 22.

Those of ordinary skill in the art will appreciate that the functionality included in the AP 20 shown in FIG. 2 may alternatively (or additionally) be included in a gateway, such as the gateway 12 shown in FIG. 1. Thus, for purposes of this specification and the claims, unless expressly specified otherwise, the term "access point" is intended to include a gateway.

In some embodiments, the AP 20 and the STA 22 may share beacon reports using BLE, by which an STA reports the beacons or probe responses it receives during a measuring period. In some embodiments, the AP 20 and the STA 22 may request that a beacon report be generated using BLE. The Beacon request/report pair enables a STA to request from another STA a list of APs it can receive on a specified channel or channels. This measurement may be done by active mode (like active scan), passive mode (like passive scan), or beacon table modes. If the measurement request is accepted and is in passive mode, a duration timer is set and the measuring STA monitors the requested channel, measures beacon, probe response, and measurement pilot power levels (RCPI), and logs all beacons, probe responses, and measurement pilots received within the measurement duration. If the measurement request is in active mode, the measuring STA sends a probe request on the requested channel at the beginning of the measurement duration, then monitors the requested channel, measures beacon, probe response, and measurement pilot power levels (RCPI), and logs all beacons, probe responses, and measurement pilots received within the measurement duration. If the request is beacon table mode, then the measuring STA returns a Beacon Report containing the current contents of any stored beacon information for any channel with the requested SSID and BSSID without performing additional measurements.

In some embodiments, the AP 20 and the STA 22 may share frame reports using BLE. In some embodiments, the AP 20 and the STA 22 may request that a frame report be generated using BLE. Frame reports typically contain information on the channel traffic at, and a count of all the frames received at, the measuring STA. For each unique Transmitter Address, the STA reports the Transmitter Address, number of frames received from this transmitter, average power level (RCPI) for these frames, and BSSID of the transmitter.

In some embodiments, the AP 20 and the STA 22 may share channel load reports, which indicate the respective fractions of time a particular channel is busy/idle. In some embodiments channel load requests may be communicated using BLE, by which an STA or AP may use BLE to request that the load of a particular channel be measured and a channel load report be generated.

In some embodiments, the AP 20 and the STA 22 may share noise histogram reports using BLE, which measure interference levels on particular channels. In some embodiments, an AP or STA may communicate requests over BLE that noise histograms reports be generated. The noise histogram request/report pair returns a power histogram measurement of non-IEEE 802.11 noise power by sampling the channel when virtual carrier sense indicates idle and the STA is neither transmitting nor receiving a frame.

In some embodiments, the AP 20 and the STA 22 may share STA statistic reports using BLE, by which an STA reports its statistics related to link quality and network performance during a measurement period. In some embodiments, the AP 20 and the STA 22 may communicate requests over BLE that statistic reports be generated. The STA statistics request/report pair returns groups of values for STA counters and for BSS Average Access Delay. The STA counter group values include: transmitted fragment counts, multicast transmitted frame counts, failed counts, retry counts, multiple retry counts, frame duplicate counts, Request to Send (RTS) success counts, RTS failure counts, Acknowledgement (ACK) failure counts, received fragment counts, multicast received frame counts, FCS error counts, and transmitted frame counts. BSS Average Access Delay group values include: AP average access delay, average access delay for each access category, associated STA count, and channel utilization.

In some embodiments, the AP 20 and the STA 22 may share Location Configuration Information using BLE, which indicates the presence of other APs proximate to the reporting AP. In some embodiments, the AP and the STA may request that Location Configuration information be generated. The Location request/report pair returns a requested location in terms of latitude, longitude, and altitude. It includes types of altitude such as floors and permits various reporting resolutions. The requested location may be the location of the requestor or the location of the reporting STA.

In some embodiments, the AP 20 and the STA 22 may share a neighbor report using BLE, which contains information about neighboring APs that are candidates for the STA 22 to re-associate with should the STA 22 choose to do so during roaming. In some embodiments, the STA 22 may send a request to the AP 20 using BLE to create a neighbor report. In this manner, the Neighbor Report request/report ability enables the STA 22 to collect information about APs proximate that to which it is currently associated, and this information may be used to identify potential candidates for a new connection to the network.

In some embodiments, the AP 20 and the STA 22 may share Link Measurement reports using BLE, which measure the instantaneous quality of the link between the STA 22 and the AP 20. In some embodiments, an STA may communicate a request over BLE that a Link Measurement report be generated.

In some embodiments, the AP 20 and the STA 22 may share Transmit Stream/Category Measurement data, which allows one STA to inquire of a peer QoS STA the condition of an ongoing traffic stream link between them. The Transmit Stream/Category Measurement Report provides the transmit-side performance metrics for the measured traffic stream. Trigger conditions included in the Transmit Stream/Category Measurement Request may initiate triggered Transmit Stream/Category Measurement Reports upon detection of the trigger condition.

Figure 3:
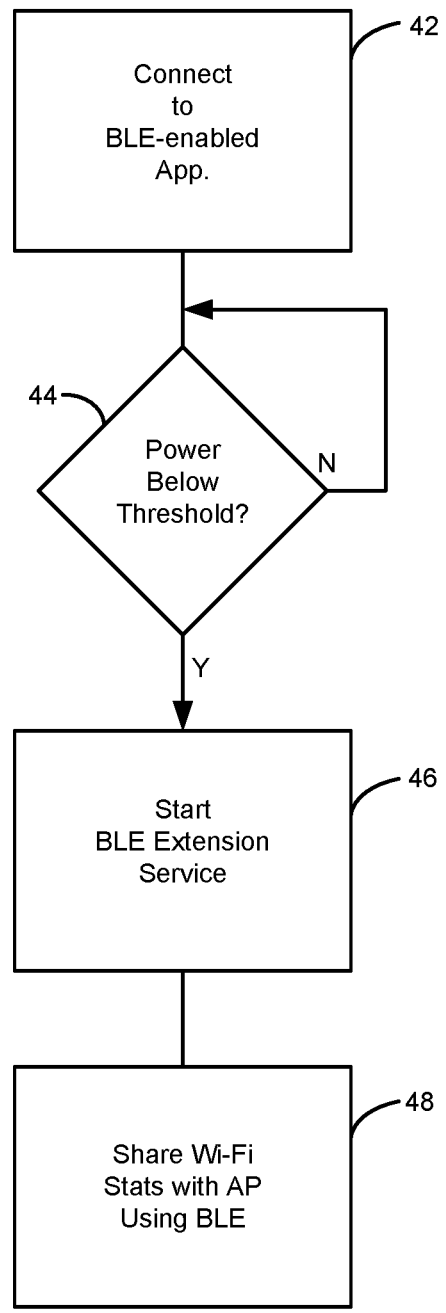
FIG. 3 shows an exemplary method used by the STA of FIG. 2.

FIG. 3 shows an exemplary method 40 used by the STA 22 of FIG. 2 to utilize BLE to share Wi-Fi information with the AP 20. At step 42 the STA connects to a BLE-enabled AP 20. At optional decision step 44, the STA 22 determines whether the power of a battery of the STA 22 is below a predetermined threshold. If the answer is no, the procedure returns to step 44. If the answer is yes, then at step 45, the STA 22 initiates the BLE extension service with the AP 20. Those of ordinary skill in the art will appreciate that, if remaining battery power then rises above the threshold, or a different higher threshold, then in some embodiments communication of BLE may be suspended. Those of ordinary skill in the art will further appreciate that, if the optional step 44 is omitted, the STA 22 may initiate the BLE extension service at step 46 once the STA 22 is connected to a BLE-enabled AP 20. Once the BLE extension service is activated, at step 48 the STA 22 and the AP 20 may share Wi-Fi statistics using BLE as described above.

Those of ordinary skill in the art will appreciate that the functionality included in the STA 22 shown in FIG. 3 may alternatively (or additionally) be included in an AP (say a battery powered one), such as the AP 20 shown in FIG. 2.

Figure 4:
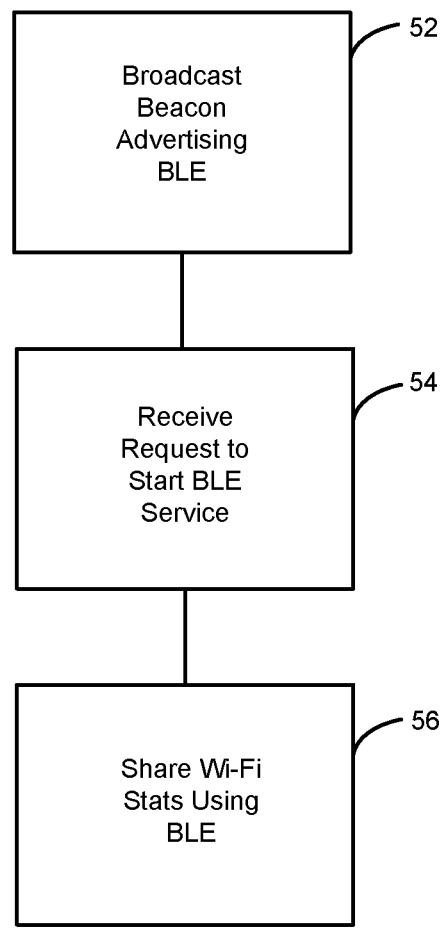
FIG. 4 shows an exemplary method used by the AP of FIG. 2.

FIG. 4 shows an exemplary method 50 that may be used by the AP 20 of FIG. 2. At step 52 the AP may broadcast a beacon or otherwise send a signal to connected or potentially-connected STAs 22 that the AP 20 is capable of communicating over BLE. At step 54 the AP 20 receives a request to start the BLE service from an STA, and at step 56 the AP 20 shares Wi-Fi statistics with the requesting STA. In other embodiments, the AP may request to start the BLE service on a STA, and at step 56 the AP 20 shares Wi-Fi statistics with the participating STA 22.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A access point capable of operation in a wireless network, the access point comprising:
a Bluetooth Low Energy (BLE) transceiver communicatively coupled to a processor;
the processor coupled to a memory, the processor and memory together enabling Bluetooth Low Energy (BLE) communication via the BLE transceiver with at least one client device in the wireless network, wherein the wireless network is a Wi-Fi network;
wherein the access point is configured to communicate, to the at least one client device, an indication that the access point is enabled to use the BLE communication,
wherein the access point is configured to, upon request from the at least one client device, exchange information about the wireless network over a BLE channel; and
wherein the at least one client device is configured to initiate a BLE extension service for exchanging information about the wireless network over the BLE channel when a remaining capacity of a power supply falls below a first predetermined threshold, and to suspend the BLE extension service if the remaining capacity of the power supply rises above a second predetermined threshold.

2. The access point of claim 1 capable of transmitting data using Gaussian frequency shift modulation, with a bit rate of 1 Mbit/s and a maximum transmit power of 10 mW.

3. The access point of claim 1 implementing a radio interface operating in 2.4-2.4835 GHz ISM band, broadcasting over forty 2-MHz channels.

4. A method, comprising:
communicating, from the access point to a client device, an indication that the access point has an ability to communicate using Bluetooth Low Energy (BLE);
receiving, in the access point from the client device, a request to communicate information about a wireless network; and
exchanging information about the wireless network over a BLE channel, wherein the exchanged information includes beacon reports;
initiating, in the client device, a BLE extension service for exchanging information about the wireless network over the BLE channel when a remaining capacity of a power supply falls below a first predetermined threshold; and
suspending, in the client device, the BLE extension service if the remaining capacity of the power supply rises above a second predetermined threshold.

5. The method of claim 4 where the exchanged information includes frame reports.

6. The method of claim 4 where the exchanged information includes channel load reports.

7. The method of claim 4, wherein the exchanged information includes noise histogram reports.

8. The method of claim 4, wherein the exchanged information includes statistic reports.

9. The method of claim 4 where the exchanged information includes Location Configuration reports.

10. The method of claim 4 where the exchanged information includes neighbor reports.

11. The method of claim 4 where the exchanged information includes Link Measurement reports.

12. The method of claim 4 where the exchanged information includes Transmit Stream/Category Measurement reports.

13. The method of claim 4 where the exchanged information includes requests to generate reports.

14. A method comprising:
connecting to an access point (AP) capable of communicating over a wireless network using Bluetooth Low Energy (BLE);
starting a BLE extension service, wherein the step of starting the BLE extension service is delayed until the remaining capacity of a power supply falls below a first predetermined threshold;

exchanging information about the wireless network with the AP over a BLE channel; and suspending the BLE extension service if the remaining capacity of the power supply rises above a second predetermined threshold.

15. The method of claim 14, where the second predetermined threshold is higher than the first predetermined threshold.

16. The method of claim 14, where the first predetermined threshold is the same as the second predetermined threshold.

17. The method of claim 14 implemented on an application of a client of the AP.

* * * * *